United States Patent
Suendermann et al.

(10) Patent No.: US 9,558,183 B2
(45) Date of Patent: Jan. 31, 2017

(54) SYSTEM AND METHOD FOR THE LOCALIZATION OF STATISTICAL CLASSIFIERS BASED ON MACHINE TRANSLATION

(75) Inventors: David Suendermann, New York, NY (US); Jackson Liscombe, Brooklyn, NY (US); Krishna Dayanidhi, Jersey City, NJ (US); Roberto Pieraccini, New York, NY (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 873 days.

(21) Appl. No.: 13/393,977

(22) PCT Filed: Sep. 3, 2010

(86) PCT No.: PCT/US2010/047828
§ 371 (c)(1),
(2), (4) Date: Mar. 2, 2012

(87) PCT Pub. No.: WO2011/029011
PCT Pub. Date: Mar. 10, 2011

(65) Prior Publication Data
US 2012/0166183 A1    Jun. 28, 2012

Related U.S. Application Data

(60) Provisional application No. 61/239,950, filed on Sep. 4, 2009.

(51) Int. Cl.
G06F 17/27 (2006.01)
G06F 3/00 (2006.01)
G06F 17/28 (2006.01)
G06F 17/30 (2006.01)

(52) U.S. Cl.
CPC ....... *G06F 17/289* (2013.01); *G06F 17/30654* (2013.01)

(58) Field of Classification Search
CPC .................................................... G06F 17/274
USPC .................................................................. 704/9
See application file for complete search history.

(56) References Cited

U.S. PATENT DOCUMENTS

| | | | |
|---|---|---|---|
| 6,195,631 B1* | 2/2001 | Alshawi | G06F 17/2827 704/2 |
| 6,349,275 B1* | 2/2002 | Schumacher | G06F 17/30905 704/1 |
| 6,470,306 B1* | 10/2002 | Pringle | G06F 17/241 704/3 |
| 7,353,165 B2* | 4/2008 | Zhou | G06F 17/2827 704/2 |
| 7,552,452 B2* | 6/2009 | McHugh | G06F 17/212 704/1 |
| 8,406,384 B1* | 3/2013 | Tremblay | H04M 3/51 379/67.1 |

(Continued)

*Primary Examiner* — Timothy Nguyen
(74) *Attorney, Agent, or Firm* — Synchronoss Technologies, Inc.; Frederick W. Dour (57) ABSTRACT

A system and method for localizing a spoken dialog system is disclosed. Source data from a source language spoken dialog system is accessed, including semantic annotations and transcriptions of a plurality of utterances. The transcriptions are machine-translated into a target language. Semantic classifiers are trained on the machine translated transcriptions and the source language semantic annotations.

16 Claims, 7 Drawing Sheets

(56) References Cited

U.S. PATENT DOCUMENTS

| | | | | |
|---|---|---|---|---|
| 8,838,434 B1* | 9/2014 | Liu | ................. | G06F 17/289 |
| | | | | 704/2 |
| 2002/0032564 A1* | 3/2002 | Ehsani | ............. | G06F 17/2775 |
| | | | | 704/235 |
| 2004/0117189 A1* | 6/2004 | Bennett | ............ | G06F 17/27 |
| | | | | 704/270.1 |
| 2004/0199375 A1* | 10/2004 | Ehsani | ............. | G06F 17/2775 |
| | | | | 704/4 |
| 2005/0228636 A1* | 10/2005 | Erhart | ............. | G06F 17/289 |
| | | | | 704/2 |
| 2006/0129381 A1* | 6/2006 | Wakita | ............. | G06F 17/2872 |
| | | | | 704/9 |
| 2007/0043567 A1* | 2/2007 | Gao | ................. | G10L 15/26 |
| | | | | 704/257 |
| 2007/0255554 A1* | 11/2007 | Cai | ................. | G06F 17/289 |
| | | | | 704/9 |
| 2008/0133245 A1 | 6/2008 | Proulx et al. | | |
| 2008/0177547 A1* | 7/2008 | Yaman | ............. | G10L 15/1815 |
| | | | | 704/257 |
| 2010/0023331 A1* | 1/2010 | Duta | ................. | G10L 15/063 |
| | | | | 704/257 |
| 2010/0179803 A1* | 7/2010 | Sawaf | .............. | G06F 17/28 |
| | | | | 704/2 |

\* cited by examiner

SYSTEM AND METHOD FOR THE LOCALIZATION OF STATISTICAL CLASSIFIERS BASED ON MACHINE TRANSLATION

CROSS REFERENCE TO RELATED APPLICATIONS

This application claims priority to U.S. Provisional Patent Application Ser. No. 61/239,950 filed Sep. 4, 2009, the entirety of which is incorporated by reference herein.

BACKGROUND OF THE INVENTION

1. Field of the Invention

The present invention relates generally to a system and method for spoken dialog systems.

2. Background Discussion

Automatic spoken dialog systems are often very complex. They may consist of hundreds of dialog states involving extensive dialog structures, have system integration functionality that communicates with backend databases or devices, support multiple input and output modalities, and can sometimes handle calls over more than 20 minutes in duration. In order to keep a caller engaged in such environments, the use of human-like speech processing is critical, e.g., the incorporation of various degrees of spoken language understanding, mixed-initiative handling, and dynamic response generation. One type of spoken language understanding, called natural language understanding, on a large scale was first introduced to automated spoken dialog systems as call classifiers. Here, the caller was asked a general question at the top of the call, such as, "Briefly tell me what you're calling about today." The caller's utterance was transcribed using a speech recognizer, and the caller was routed to a human agent based on a class of the utterance produced by a semantic classifier. The human agent then interacted with the caller providing services including, e.g., technical problem solving, billing support, or order processing. Other interactions may not require free form natural language input from the caller, but the speaking of simple commands as instructed by prompts, like yes or no, typically referred to as directed dialog input.

Typically, spoken dialog systems are built using semantic classifiers for most or all of the dialog contexts, both for natural language as well as for directed dialog inputs. A semantic classifier is a program that provides a mapping between utterances a speech recognizer produces and one or more predefined semantic classes which represent different categories of meaning. Semantic classifiers can be rule-based, i.e. manually generated as a set of rules that provide said mapping, or statistical, i.e. based on a statistical classification model whose parameters are trained from data, i.e. transcribed training utterances (transcriptions) and their respective semantic meanings (annotations). There can also be combinations of rule-based and statistical classifiers. Statistical semantic classifiers are today used almost exclusively for natural language input, while rule-based classifiers are typically used for directed dialog input.

Modern spoken dialog systems can be very complex applications comprising thousands of activities, classifiers, and prompts. Years of developing work can be spent to design these systems and much effort undertaken to tune involved speech recognition classifiers to achieve highest possible performance crucial for user acceptance and effectiveness of the applications. Such tuning can require processing of huge numbers of calls to analyze caller behavior in every single context of the system, building of recognition classifiers to effectively interpret caller utterances, and designing the application to respond appropriately at every context.

In an example, to tune a spoken dialog system for Internet, cable TV, and Voice-over-IP troubleshooting, more than two million speech utterances can be collected, transcribed, annotated, and used for training statistical classifiers, boosting overall accuracy from an initial 78.0% to 90.5% accuracy. Although transcription and annotation of such amounts of data is partially automatable, it can still keep several people busy for months. While transcription is a relatively straightforward exercise, semantic annotation, i.e. the mapping of a lexical content to one of a number of semantic symptoms, requires knowledge about the application. Not only must annotators understand what a caller utterance means in response to the system prompt in the respective context, but there are several aspects to semantic annotation making it a non-trivial undertaking, such as Utterances may have no representation in the given set of symptoms suggesting that they are out-of-scope for the classifier.

When the ratio of out-of-scope utterances grows and well-distinguishable patterns manifest themselves, annotators are to suggest the introduction of new symptoms to the system designer.

Utterances may be ambiguous, vague, too specific, or carry content belonging to multiple symptoms making it hard for the annotator to make a decision.

Annotations have to follow a number of quality assurance criteria to produce powerful and exact results including criteria for completeness, consistency, congruence, correlation, confusion, coverage, and corpus size (i.e., "C7" criteria").

These issues emphasize that thorough speech recognition tuning in spoken dialog systems can be a very expensive task. Large scale spoken dialog systems as introduced above are mostly used in relatively big enterprises trying to optimize their customer care telephone portals. Many of these companies operate internationally producing a need to localize their phone services including involved spoken dialog systems. Localization of a dialog system entails translating it from one language to another. The high cost of producing and maintaining systems in different languages obviously increases as more languages are considered. Not only the cost, but also the time to generate speech recognition classifiers from scratch is a crucial issue when localizing a given spoken dialog system.

SUMMARY

The present invention is directed systems and methods for localizing a spoken dialog system.

In one embodiment, disclosed is spoken dialog system, comprising a computer including a processor, and memory, including a signal input for receiving an audio input; a speech recognition engine; a data store comprising a set of semantic classifiers; a data store for a plurality of utterances received via the audio input; a data store for storing annotated utterances, the annotated utterances being provided from a source language spoken dialog system; a semantic classifier component including a semantic classifier program for, when executed by the processor, mapping the utterances to a set of semantic classes; a data store for storing a plurality of machine-translated transcriptions, wherein a machine translation component translated utterances transcribed in a source language from a source language spoken dialog system into machine-translated transcriptions for a target language; and a training component for training a semantic classifier using the machine-translated transcriptions and the source language annotations. The system can further include a data derivation component including a program for deriving training data and testing data from the annotated utterances. The deriving component can further include program instructions for further separating the training data into training data and development data.

The system can further include a component for optimizing speech processing in a spoken dialog system, which can comprise a classifier update generation component including a program for, when executed by the processor, generating an update candidate for an initial set of semantic classifiers using data from the annotated utterances and trained on the machine-translated transcribed utterances; and a comparison component including a program for, when executed by the processor, comparing a performance of the update candidate against the initial set of semantic classifiers by testing the update candidate and the initial set of semantic classifiers against a baseline criterion, whereby the initial set of semantic classifiers is updated with the update candidate if the update candidate outperforms the initial set of classifiers.

The training component can include program instructions for, when executed by a processor: training of language models; training of acoustic models; training a global speech recognizer; and training a context-dependent speech recognizer.

The system can further comprise a remote host for at least one of the components of the system. At least one of the components of the system can include a separate module that can be incorporated into a spoken dialog system.

The machine translation component is selected from the group consisting of a rule-based machine translator, a statistical machine translator; and a machine translator that is part rule-based and part statistical.

In another embodiment, disclosed is a method for localizing a spoken dialog system comprising: accessing source data from a source-language spoken dialog system, the source data including semantic annotations and transcriptions of a plurality of utterances; machine-translating the transcribed utterances into a target language; and training a semantic classifier for the localized spoken dialog system using the machine translated transcriptions and the source language semantic annotations.

The method can further include optimizing speech processing in the localized spoken dialog system. The method can further include generating an update candidate for an initial set of semantic classifiers trained on the annotated utterances and the machine-translated transcribed utterances; and comparing a performance of the update candidate against the initial set of semantic classifiers by testing the update candidate and the initial set of semantic classifiers against a baseline criterion, whereby the initial set of semantic classifiers is updated with the update candidate if the update candidate outperforms the initial set of classifiers. The method can further include deriving testing data and training data from the annotated utterance's. The method can further include: separating the training data into training data and development data. The training can further include: training of language models; training of acoustic models; training a global speech recognizer; and training a context-dependent speech recognizer.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments, described, may best be understood in conjunction with the accompanying drawings, in which.

DETAILED DESCRIPTION

It is noted that in this disclosure and in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used herein, the indefinite article "a" or "an" and the phrase "at least one" shall be considered, where applicable, to include within its meaning the singular and the plural, that is, "one or more."

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

It is to be understood that the present invention can be implemented in various forms of hardware, software, firmware, special purpose processors, or a combination thereof. In one embodiment, the present invention can be implemented in software as an application program tangibly embodied on a computer readable program storage device. The application program can be uploaded to, and executed by, a machine comprising any suitable architecture.

Large scale exploitation of transcription and annotation of all the utterances collected by a speech recognizer in millions of calls enables rigorous replacement of manually written utterance classifiers, common in commercial spoken dialog systems, by statistical classifiers which are conventionally used only in open-prompt contexts, as described in U.S. patent application Ser. No. 12/425,892, the entirety of which is incorporated by reference herein. Moreover, even a small number of utterances, 1000 or less, can be enough to train statistical classifiers which consistently outperform their rule-based counterparts. An implementation of the replacement of manually written utterance classifiers by statistical classifiers follows. Table 1 gives an example of the parameter settings used for the continuous improvement cycle, and Table 2 provides an overview of the data resources and actual classifier performance over three months.

TABLE 1

Parameter settings

| criteria thresholds | |
| --- | --- |
| minimum test set size | 1,000 utterances |
| minimum coverage | 90% |
| performance thresholds | |
| Performance: | $P_{new} - P_{old} > 0$ |
| $P = \dfrac{\text{correctly classified utterances}}{\text{total utterances}}$ | |
| significance: two-proportion z-test | $p < 0.05$ |
| Classifiers | |
| language model | trigram + smoothing |
| classifier | naïve Bayes + boosting |

TABLE 2

Data resources and classifier performance at three months.

| utterances | 2,184,203 |
| --- | --- |
| calls | 533,343 |
| activities | 2,021 |
| classifiers | 145 |
| original average performance | 77.97% |
| average performance at 3 months | 90.49% |

When a first version of this application was launched, the average performance of all rule-based classifiers was around 78%. This includes directed dialogs, lower performing activities with open prompts, and higher performing standard contexts (such as yes/no), all weighted by their frequencies of use. After three months, almost 2.2 million utterances had been transcribed and annotated and had circulated dozens of times through the continuous improvement cycle. Whenever a classifier/grammar significantly outperformed the most recent baseline, it was released and put into production leading to an incremental improvement of performance throughout the application. As an example, in a top-level large-vocabulary semantic classifier that distinguishes more than 250 different classes, almost every two weeks, there was enough data collected in the cycle that a new version could be released. Performance was not saturated at 100,000 collected utterances for this classifier, nevertheless. The overall performance of the application went up to more than 90% within three months of the introduction of the continuous improvement cycle. Classifiers whose data met the quality assurance criteria outperformed the rule-based counterpart. The following two examples emphasize this finding:

(1) Suppose callers have trouble with getting online, and they get transferred to the Internet troubleshooting system which helps them to get connected. At the end of this process, the callers are asked to access a certain website to make sure they are back online. At this activity, they are expected to respond with utterances such as "I am connected", "still no Internet", "repeat the address, please", or one of the global utterances "I need help", "hold on", "repeat", or "agent", etc. The manually tuned rule-based classifier exhibited a reasonably high performance of 90.6%. After collecting almost 8000 utterances for this context, a classifier was trained and reported a performance of 98.8%. This result was at first considered suspicious since it means a misclassification of only 12 out of 1000 utterances including garbage events. This was deemed impossible, and the classifier was initially not released. However, further investigation into the correctness of the testing procedure showed that this classifier did indeed perform at a near-human level.

(2) In another context, callers having a problem with their digital video recorder (DVR) are asked what exactly the issue is. They may say "I would like to install my DVR", "I don't know how to record", "my DVR box is frozen", "I cannot turn on my box", and some other global utterances as in the above example. The rule-based classifier performed at 84.9%, which is relatively high for such a context with a large variability among the responses. As this context is not reached very frequently in the application, there were initially only 1087 utterances available for the first round of the continuous improvement cycle. According to the quality assurance criteria formulated above with respect to, inter alia, a corpus size check, the minimum test size was 1000, so only 87 utterances remained for training. Remarkably, the classifier built on this sparse data set achieved a performance of 87.8% on the same test set, significantly outperforming the baseline classifier.

Accordingly, large-scale utterance collection, transcription, and annotation, in conjunction with a rigorous quality assurance process, can be used in the scope of a timely and continuous improvement cycle to successively replace classifiers and increase the overall performance of a dialog system significantly and systematically.

Text classifiers are used e.g. in topic search, sentiment analysis, and statistical spoken dialog systems (here also referred to as semantic classifiers where the classified texts can be caller utterances). Common, implementations of text classifiers are based on statistical models which are trained on a number of example texts associated with their underlying classes. For example, in spoken dialog systems, millions of utterances can be collected, transcribed, annotated with their semantic meanings (their classes), and then fed into a training algorithm for statistical utterance classifiers. These classifiers are then used in the production system to "understand" the meaning of a caller's utterance as described as described in U.S. patent application Ser. No. 12/425,892, the entirety of which is incorporated by reference herein.

When an application involving text classifiers such as the one described above is to be localized—i.e., it is to be implemented in a different language—conventionally, the entire procedure of collecting utterances, transcribing them, associating them with their classes, and training the classifier has to be redone. This can be a very expensive and time-consuming endeavor because of (1) the absence of any data of the target language (e.g., when a spoken dialog system is to be localized, the utterance classifiers must be trained before the system goes into production; i.e., there is no data available in the beginning to start working with), (2) the lack of experts in the target language to perform transcription and annotation, (3) the sheer amount of transcriptions and annotations to be processed which can e.g. be several million documents, (4) the cost of manual labor involved to process these possibly huge amount of data, and (5) The conventional approach is barely scalable since, for every additional language, the whole effort has to be repeated. In particular for languages for which the application's call volume is not expected to be very high, conventional localization is not feasible due to the high costs involved.

A system and a method to localize statistical utterance classifiers are disclosed. The system and method make use text classifiers trained on transcribed and annotated data of a source language, such as utterance classifiers in a spoken dialog system. These classifiers can be localized to a different language by using the available source language's transcriptions and feeding them into a machine translation system which translates them into a target language. With every source transcription text (i.e., utterance), there is an annotation (which is not altered) associated which can be mapped to the respective translated text (or utterance). The machine-translated texts and their annotations are then subject to training of text classifiers for the target language.

Thus transcribed and annotated data available for the original (source) language of the spoken dialog system is obtained. Machine translation is applied to the given transcriptions keeping the semantic annotations, and finally statistical classifiers are trained based on the translated utterances and the original annotations.

Theoretical Discussion

The localization of speech recognition based on machine translation, is related to several areas of speech processing including automatic speech recognition, machine translation, and speech translation. The following high-level overview on the main probabilistic apparatus of these related disciplines indicates how they are mathematically interconnected.

Speech Recognition (Speech F to Text f)

In the digital age, the usual input to speech recognition is a pulse-code modulated (or similarly coded) chunk of audio which most often is transformed to a sequence of feature vectors F. Given this vector sequence, the non-trivial problem is to find the most probable sequence of words:

$$f = \operatorname*{argmax}_{\varphi} p(\varphi \mid F) \qquad (1)$$

where $\varphi$ iterates over the set of all possible word sequences. Bayes' theorem allows rewriting this formula into:

$$f = \operatorname*{argmax}_{\varphi} p(\varphi) p(F \mid \varphi) \qquad (2)$$

Here, $p(\varphi)$ is the probability of the word sequence $\varphi$, commonly referred to as a language model, whereas $p(F|\varphi)$ is the conditional probability that the feature vector sequence F was produced by the word sequence $\varphi$, referred to as acoustic model.

Machine Translation (Text f to Text e)

Machine translation can be described similarly by searching for that word sequence of the target language e being the most likely translation of the source word sequence f:

$$e = \operatorname*{argmax}_{\varepsilon} p(\varepsilon \mid f) \qquad (3)$$

where $\varepsilon$ iterates over the set of all possible target word sequences. Bayes' theorem is applied to produce:

$$e = \operatorname*{argmax}_{\varepsilon} p(\varepsilon) p(f \mid \varepsilon) \qquad (4)$$

with the target language model $p(\varepsilon)$ and the so-called translation model $p(f|\varepsilon)$ which expresses the probability that the source (or foreign) language word sequence f is the translation of the target (or native) language word sequence $\varepsilon$.

Speech Translation (Speech F to Text e)

The coupling of automatic speech recognition and machine translation allows for directly translating spoken utterances into another language. Here, the most probable target language word sequence e was searched, given an acoustic source vector sequence F as $$\begin{aligned} e &= \operatorname*{argmax}_{\varepsilon} p(\varepsilon \mid F) \\ &= \operatorname*{argmax}_{\varepsilon} p(\varepsilon) p(F \mid \varepsilon) \\ &= \operatorname*{argmax}_{\varepsilon} p(\varepsilon) \sum_{\varphi} p(F \mid \varphi, \varepsilon) p(\varphi \mid \varepsilon) \\ &\cong \operatorname*{argmax}_{\varepsilon} p(\varepsilon) \sum_{\varphi} p(F \mid \varphi) p(\varphi \mid \varepsilon). \end{aligned} \qquad (5)$$

The last step's approximation assumes that the acoustic realization of an utterance in a language only depends on the underlying word sequence of the same language and is independent of its translation into another language. Here is found the target language model, source acoustic model, and translation model in combination.

Speech Recognition Localization (Speech E to Text e)

Now, to localize speech recognition to another (a target) language, the feature sequence E is transcribed to a word string e as per Equation 2:

$$e = \operatorname*{argmax}_{\varepsilon} p(E \mid \varepsilon) p(\varepsilon). \qquad (6)$$

In applications such as commercial applications, the acoustic model p(E|ε) is provided by the speech recognizer's manufacturer whereas the target language model will most often be context- and application-dependent, i.e., it has to be rebuilt. As explained above, knowledge from the source language is applied as can be expressed by extending Equation 6 as follows:

$$e = \operatorname*{argmax}_{\varepsilon} p(E \mid \varepsilon) \sum_{\varphi} p(\varphi) p(\varepsilon \mid \varphi). \qquad (7)$$

This formulation leaves us with the translation model p(ε|φ) implemented in a machine translation environment as discussed in the discussion of Machine Translation (Text f to Text e) as well as with the source language model p(φ) whose approximation produces no additional cost in the present localization scenario due to the large set of source utterances available.

Exemplary Implementation

Figure 3:
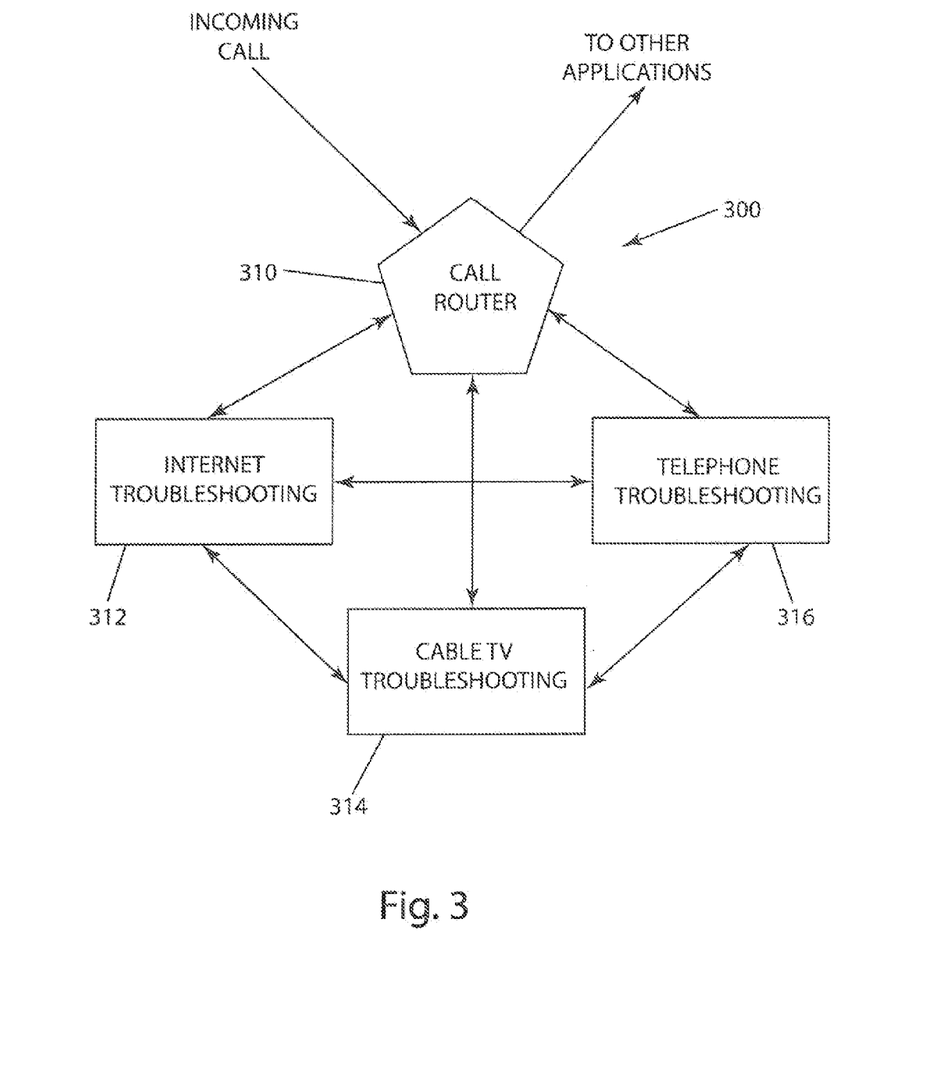
FIG. 3 illustrates an example of a dialog application comprising four individual dialog systems interacting with each other.

FIG. 3 shows an exemplary embodiment of a dialog application 300 comprising four individual dialog systems interacting with each other. In the exemplary embodiment, they are implemented in a "customer care" telephone portal of a large service provider (e.g. a cable service provider).

When customers call the hotline of the service provider, they are connected to a top-level call router 310 whose task is to determine the call reason and route the callers to the appropriate destination. This is done by accessing the callers' account information (using their telephone number as an identifier) and then asking either a general opening question such as "Briefly tell me what you're calling about today," or a caller-specific question such as "It looks like you called recently about your account. Are you calling about that now?" Depending on the caller response to the opening question and, potentially, to one or two follow-up questions, the most appropriate routing point is determined, and the call is transferred. If the call is about a technical problem with one ore more of the provider's services (e.g., broadband Internet 312, cable TV 314, or telephone 316), the call is connected to one of the three respective troubleshooting dialog systems 312, 314, 316. If customers face problems with more than one service, they can be interconnected to one of the other troubleshooting dialog systems 312, 314, 316 or back to the call router 310.

The machine translation algorithm and the experimental setup are described as follows.

The Source Data

As an example case, source data was collected in the scope of a large-scale English dialog system for broadband Internet troubleshooting as described in further detail in K. Acomb, J. Bloom, K. Dayanidhi, P. Hunter, P. Krogh, E. Levin, and R. Pieraccini, "Technical Support Dialog Systems: Issues, Problems, and Solutions," in *Proc. of the Workshop on Bridging the Gap: Academic and Industrial Research in Dialog Technologies*, Rochester, USA, 2007.

Over a time span of more than three years, dozens of millions of calls were processed by this system. On a subset of these calls, utterances were captured, transcribed, and annotated according to their semantic meaning. Table 3 gives an overview about the amount of involved data listing the number of calls with transcribed utterances, the number of transcribed and annotated utterances, activities, and classifiers. Due to a continuous improvement cycle applied to the example application, as described above, several existing classifiers were regularly updated by optimized statistical language models and classifiers. The continuous improvement cycle is described in further detail in U.S. patent application Ser. No. 12/425,892, the entirety of which is incorporated by reference herein. Consequently, several versions of classifiers in the same recognition context were used over the time of the data collection. As for the purpose of the present exercise all the data collected in such contexts was used independently of the actual classifier version active at the time of the utterance capture, contexts originating from the same original or root classifier are not distinguished. Also the number of root classifiers is given in Table 3.

TABLE 3

Table 1: Overview on the English source data.

| | |
|---|---|
| calls | 1,159,940 |
| transcribed utterances | 4,293,898 |
| annotated utterances | 3,846,050 (89.6%) |
| activities | 2,332 |
| grammars | 253 |
| root grammars | 134 |

Figure 1:
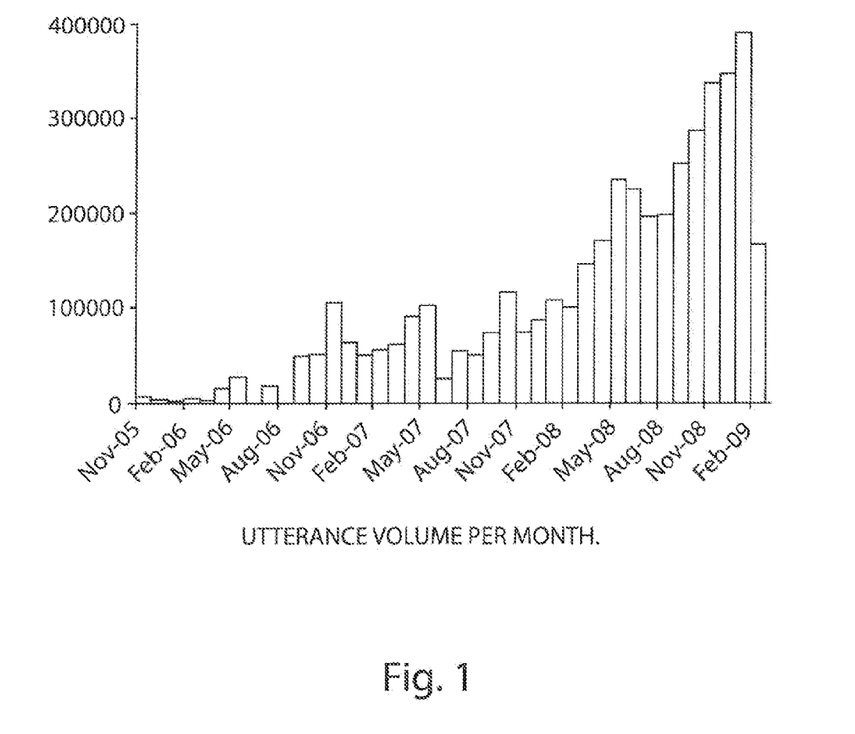
FIG. 1 is a graph illustrating the distribution of utterances per month collected over more than three years in a source language spoken dialog system.

FIG. 1 shows the distribution of these utterances over the mentioned time period indicating that the capture volume was ever-increasing since the start of the project.

Translation

All transcribed utterances of Table 3 were translated from English into Spanish using a commercial statistical machine translation software. This was done completely unsupervised. No corrections of the output or any tuning of the machine translator was performed.

TABLE 4

Training settings.

| | |
|---|---|
| language model | trigram + smoothing |
| classifier | naïve Bayes + boosting |
| language/acoustic model tradeoff | 0.8 |
| training accuracy cutoff | 99% |
| acoustic rejection threshold | 5% |
| semantic rejection threshold | 0% |

Training

Figure 2:
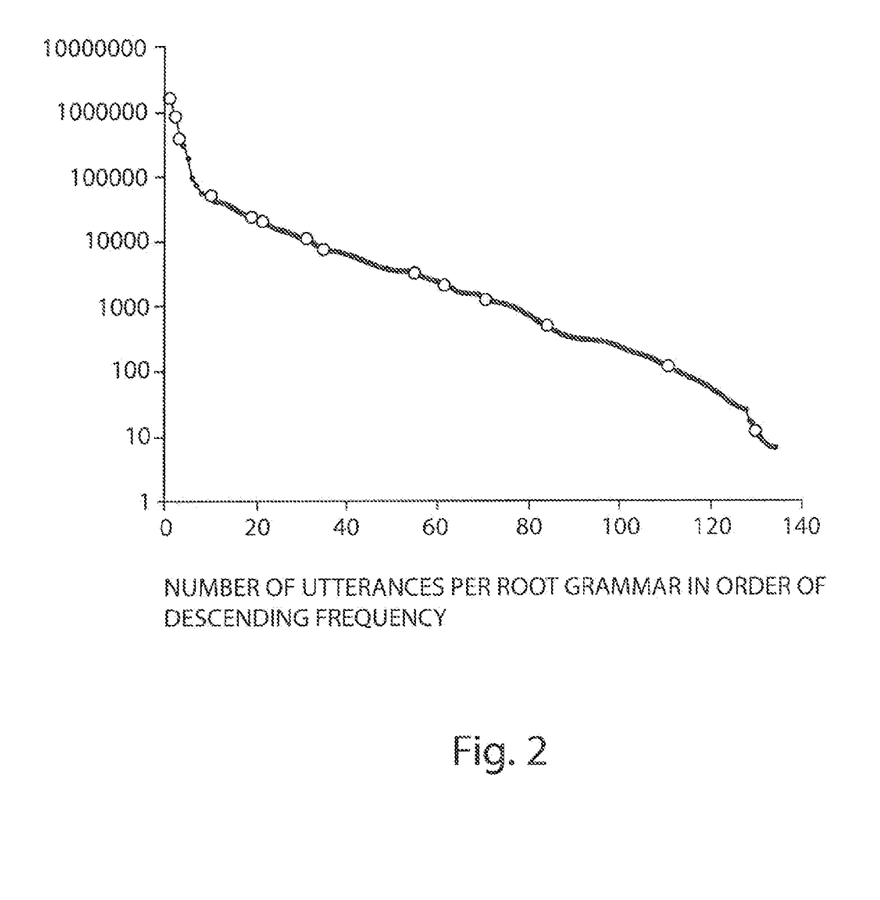
FIG. 2 is a graph showing the distribution of the number of utterances per classifier/root grammar in order of descending frequency.

For all distinct root classifiers of Table 3, the respective translated Spanish utterances and their original semantic annotations were used to train a statistical language model and a statistical classifier using standard settings for the involved parameters, as no development data was available (development data would have to be based on Spanish speech data since language model and classifier have to be applied to a speech recognizer in the target language). These settings are given in Table 4. FIG. 2 shows the (Zipf-like) distribution of the number of utterances for each of the classifiers in descending order showing that there are classifiers exceeding one million utterances (a typical yes/no context) as well as numerous classifiers facing data sparseness (22 classifiers feature less than 100 training utterances).

Test

To test (a subset of) the automatically translated classifiers, a limited number of utterances from a Spanish version of a similar broadband Internet troubleshooting dialog system was collected, transcribed, and annotated. The characteristics of this data are shown in Table 5. FIG. 2 indicates the classifiers found in the test data as white bullets showing that they are distributed among different magnitudes of amounts of available training data.

TABLE 5

Overview on the Spanish testing data.

| | |
|---|---|
| calls | 951 |
| transcribed utterances | 11,470 |
| annotated utterances | 11,470 (100.0%) |
| activities | 144 |
| grammars | 17 |

Now, a batch experiment was executed performing speech recognition and classification on the complete set of collected utterances using the automatically translated classifiers in their respective contexts. For each of the 11,470 utterances, the classification result was now compared to the semantic annotation of the same utterance. In the following, accuracy is referred to as the number of acoustic events where classification result and annotation match divided by the total number of acoustic events. These events include out-of-scope utterances as well as noise, background speech, etc.

Overall accuracy for the entire test set was at 85.0% which is deemed very high compared to the performance of most boot-strapped dialog systems based on hand-crafted classifiers. Those systems often perform at less than 80% accuracy. To have a more reliable standard of comparison, a comparison was made against performance of the English source dialog system optimized on performance for several years and found that the latest available system version performed at 90.7% (measured on 930 full calls, 11274 completely annotated utterances).

While a machine translation algorithm may produce translation errors which affect the quality of the translated text material, the classifier training can still train a reliable semantic model representing the relationship between target language texts and their associated classes. For instance, a common error in machine translation is related to the word order which may follow different patterns depending on the language. The German utterance "im Winter schneit es" whose canonical translation is "in winter it snows" may very well be translated as "in winter snows it" by an automated system lacking re-order capabilities. However, many statistical text classifiers ignore the word order which means that they would produce the very same classification result for both the correct and the wrong translation.

Localizing speech recognition using machine translation can be straightforward when large amounts of transcribed and annotated data of the source language is available. Testing an example implementation of the methodology indicated that this approach outperforms manual boot-strapping but does not achieve the same accuracy like the original (source language) dialog system. The reason for the performance loss can be explained by the weakness of either of the factors in Equation 7 above.

First, the target acoustic model $p(E|\epsilon)$ is weak: In the experiment, an out-dated Spanish speech recognizer whose acoustic models did not achieve the same performance like its English counterparts was used. E.g., in yes/no (si/no) contexts, a significantly higher portion of false accepts and rejects than in equivalent English contexts were observed that were clearly independent of any linguistic factors.

Also, the translation model $p(\epsilon|\phi)$ is weak. Statistical translation not only produces a lot of commonly known artifacts, but there are cases where even a human translator would fail: A classifier is normally designed based on utterances a caller says in response to a system prompt restricting the caller's language. For instance, a Spanish prompt may say, "cuando esté desconectado, diga continúe" translated from the English prompt "when it's unplugged, say continue." Hence, most of the English responses will read "continue" which a machine as well as a human being most likely would translate into Spanish as "continuar" instead of the prompt-dependent correct "continue." So, to achieve a higher accuracy of the translation hypotheses, hypotheses could be rescored taking the respective system prompt and other application-dependent information into consideration.

Furthermore, no development data was available for this experiment since this would have required a (minimal) portion of collected target language utterances, their transcriptions and annotations.

Returning to the five main issues formulated above, localization of text classification based on machine-translation produces the following results:
  (1) No data has to be collected in addition to that available in the source language. Hence, no boot-strapping, no utterance collection, and no rule-based initial classifiers are necessary.
  (2) Since transcriptions are produced automatically and annotations are copied from the source utterances, no target language experts are required.
  (3) Machine translation is arbitrarily scalable. To translate almost 4 million utterances, it took less than a week of computation without even considering parallelization. Hence, localization based on machine translation can be carried out extremely quickly.
  (4) No human labor is involved to perform translation, transcription, or annotation. Consequently, localization based on machine translation is a very cost-effective approach.
  (5) Localization can be carried out for all language pairs for which a machine translation system is available for (as an example, Google's translation tools available at http://www.google.com/language_tools currently 21 different languages all of whose combinations are allowed, i.e., 21*20=420 different translation directions). Consequently, localization of text classifiers can also be performed for exotic language pairs which under normal circumstances would not have been possible due to lack of translators or financial resources.

It will be appreciated from the above that the invention can be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar configurations and implementations of the invention and embodiments described herein.

Figure 4:
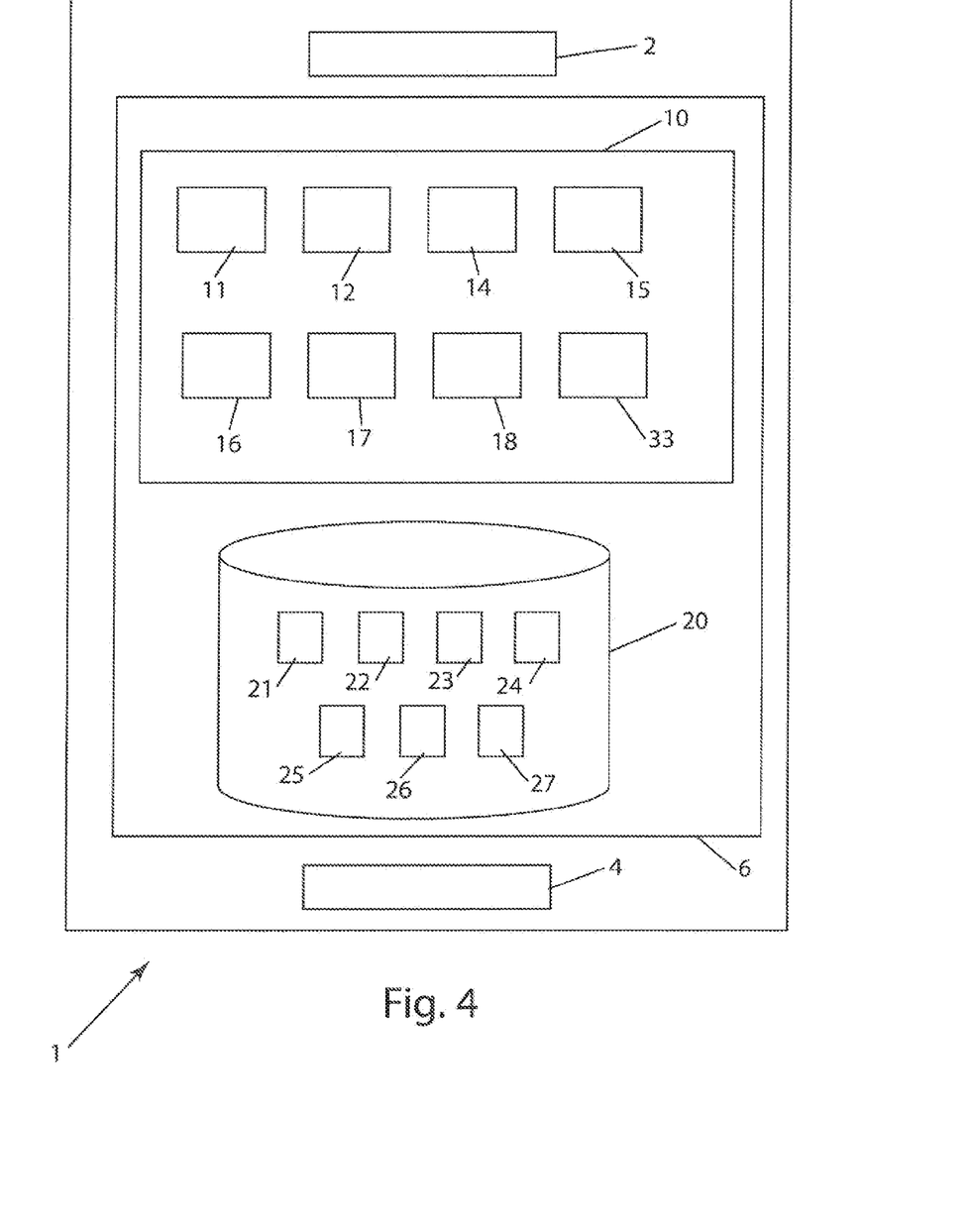
FIGS. 4 and 4A show a system overview for a system according to an embodiment of the invention.

FIG. 4 shows one embodiment of a system overview for a system for localizing semantic classifiers and implementing classifiers in spoken dialog systems. As disclosed therein a spoken dialog system 1, comprises a computer including, a signal input/output, such as via a network interface 2, for receiving input such as an audio input, a processor 4, and memory 6, including program memory 10. The system 1 may be implemented on a general-purpose computer under the control of a software program. Alternatively, the system 1 can be implemented on a network of general-purpose computers and including separate system components, each under the control of a separate software program, or on a system of interconnected parallel processors. Although complex, it is believed that suitable software for performing the various functions described herein can be designed and constructed by computer programmers of ordinary skill.

Figure 5:
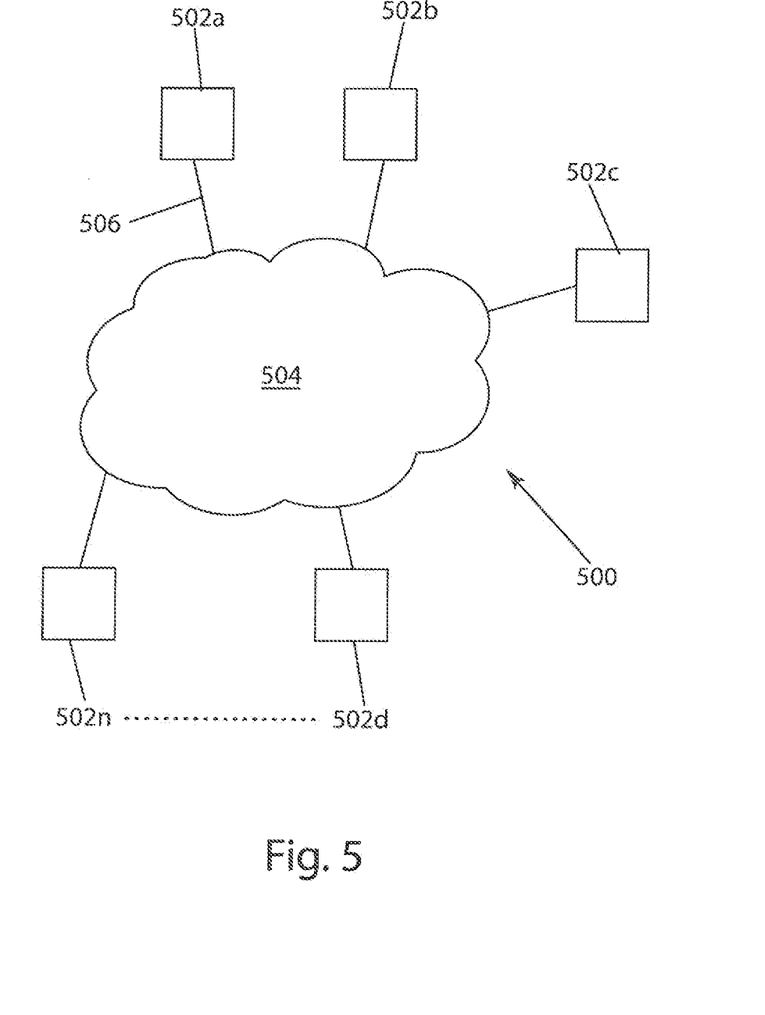
FIG. 5 shows an exemplary network environment adapted to support the present invention.

FIG. 5 shows a network environment 500 adapted to support the present invention. The exemplary environment 500 includes a network 504, and a plurality of computers, or computer systems 502(*a*) . . . (*n*) (where "n" is any suitable number). Computers could include, for example one or more relational database servers (e.g. an SQL server). Computers 502 can also include wired and wireless systems. Data storage, processing, data transfer, and program operation can occur by the inter-operation of the components of network environment 500. For example, a component including a program in server 502(*a*) can be adapted and arranged to respond to data stored in server 502(*b*) and data input from server 502(*c*). This response may occur as a result of preprogrammed instructions and can occur without intervention of an operator.

The network 504 is, for example, any combination of linked computers, or processing devices, adapted to access, transfer and/or process data. The network 504 may be private Internet Protocol (IP) networks, as well as public IP networks, such as the Internet that can utilize World Wide Web (www) browsing functionality, or a combination of private networks and public networks.

A computer 502(*a*) for the system can be adapted to access data, transmit data to, and receive data from, other computers 502(*b*) . . . (*n*), via the network or network 504. The computers 502 typically utilize a network service provider, such as an Internet Service Provider (ISP) or Application Service Provider (ASP) (ISP and ASP are not shown) to access resources of the network 504.

The computers 502 may be operatively connected to a network, via bi-directional communication channel, or interconnector, 506, which may be for example a serial bus such as IEEE 1394, or other wire or wireless transmission media. Examples of wireless transmission media include transmission between a modem (not shown), such as a cellular modem, utilizing a wireless communication protocol, or wireless service provider or a device utilizing a wireless application protocol and a wireless transceiver (not shown). The interconnector 504 may be used to feed, or provide data.

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

For example, a computer hosting a speech recognition engine may communicate to a computer hosting a classifier program or a machine translation program via local area networks, wide area networks, direct electronic or optical cable connections, dial-up telephone connections, or a shared network connection including the Internet using wire and wireless based systems.

Returning to FIG. 4, a spoken dialog system 1 includes a speech recognition engine (i.e. a speech recognizer) 12. The system also includes data storage memory 20 including a number of data stores 21, 22, 23, 24, 25, 26, 27 which can be hosted in the same computer or hosted in a distributed network architecture. Grammar is held in a grammar data store (not shown). The system 1 includes a data store for a plurality of utterances 22 received via the audio input. The system 1 further includes a classifier component including a classifier data store 23 comprising a set of semantic classifiers, as well as a semantic classifier program 14 for, when executed by the processor, mapping the set of utterances processed by the speech recognizer 12 to the set of semantic classifiers.

Also is shown a machine translation component 33. The machine translation component is shown as a program; however it can be operatively included or connected in any manner as is known by those of ordinary skill in the art, as for example, via a Web Service of a commercial machine translation system (e.g., such as a hyperlink that links to a commercial machine translation system. The translation system could be a rule-based machine translator; a statistical machine translator, or a machine translator that is part rule-based and part statistical. The machine translation component 33 accepts transcribed utterances from a source language spoken dialog system (not shown) and translates them for storage in a data store for transcribed utterances 24.

The system includes the data store for storing the utterances' transcriptions 24 and a data store for storing their annotations 25. Such data can be stored, for example, on one or more relational database servers (e.g., a server for the annotation data and a server for the transcription data). The data store storing transcriptions 24, stores the utterances translated by the machine translation component 33. Translated transcriptions and their original semantic annotations 25 are used to train a statistical language model and a statistical classifier using standard settings for select parameters.

The system also discloses a component which includes a program for deriving data 18. The program 18 derives data from the annotated utterances 25. For instance, the program 18 can be adapted to query the annotated utterances 25 so as to separate data from the annotated utterances 25 into training data 26 and testing data 27. As discussed herein, training data 26 and testing data 27 derived from the annotated utterances will not overlap, although in some instances this may be the case (e.g., there is too little data in the annotated utterances to exclusively separate into training and testing corpora). The training data 26 and testing data 27 are then used to train classifiers based on the machine-translated transcriptions 25. The training data 26 can be used to establish classifier functionally for mapping between the machine translated utterances and a class using a parameter setting such as the established settings developed on the source language annotations 25.

In one embodiment, a quality assurance component can be included, which includes a program 15 for, when executed by the processor, applying quality assurance criteria to the annotated utterances is also included in the system 1. The system 1 also includes a component including a program 16 for, when executed by the processor, generating a semantic classifier using data from the annotated utterances.

Figure 4A:
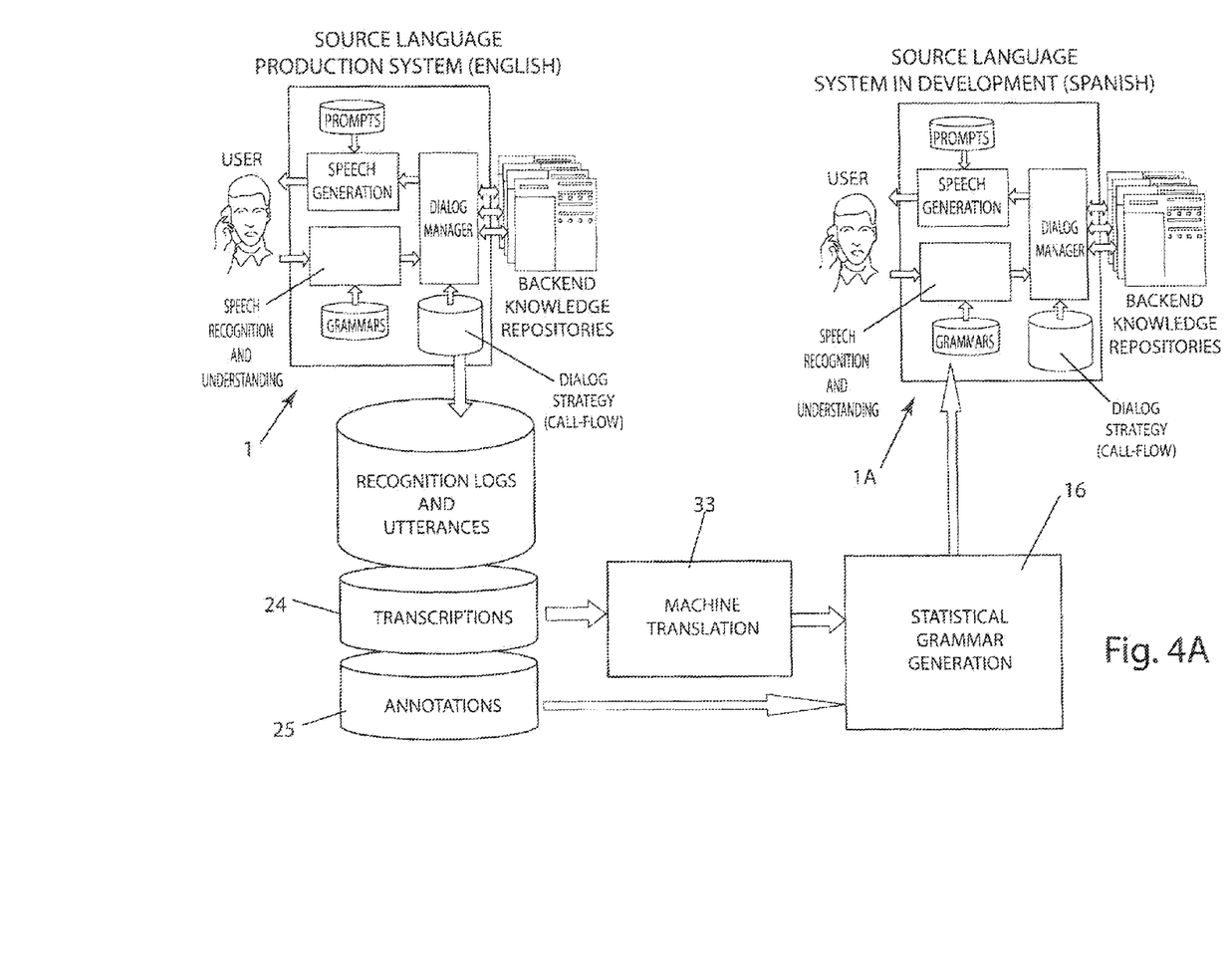

The system can also include a logging component including logging program 11 for, when executed by a processor, logging and storing data associated with the collected set of utterances. A logging data store 21 can store instances of speech recognition events identified by the speech recognition device at the semantic classifiers together with logging data for the semantic classifiers. Instances of utterance recognition events at these classifiers can be stored together with logging data including the name and version of the classifier(s) active, the semantic class resulting in the highest classification score of the current utterance, the state in which the utterance was recognized, the speech recognizer's hypothesis of the respective utterance, acoustic and semantic confidence scores of the respective utterance, the speech data itself, the spoken dialog system's version and additional information about the system, the caller, and the utterance. The logging data store 21 can include data reporting the association between a state of the dialog system when the utterances were recorded and the utterances. Also, the speech recognizer hypothesis, and acoustic and semantic confidence scores, the n·m best semantic classes of the n best speech recognizer hypotheses and their respective n acoustic confidence scores and inn semantic confidence scores can be stored:

FIG. 4A shows an exemplary embodiment of a source language production system 1 in one language (e.g. English), and a source language system in development 1A (e.g. Spanish). In accordance with the description above, the transcriptions 24 from the source language system 1 are machine translated by a machine translation component, while the annotations 25 are not altered. Statistical grammar generation is carried out as translated transcriptions and their original semantic annotations 25 are used to train a statistical language model and a statistical classifier using standard settings for select parameters. These classifiers are thereby localized to a different language, which can then be implemented in the source language system in development.

Figure 6:
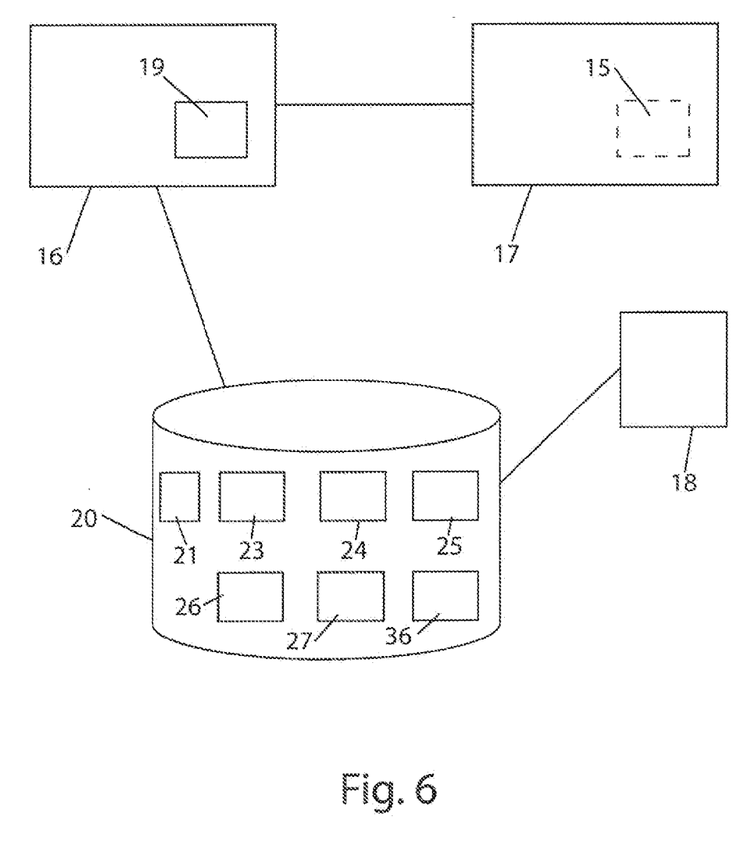
FIG. 6 shows an example of an embodiment of an optimized classifier generation component according to an embodiment of the invention.

FIG. 6 shows one embodiment including a component 16 for generating a classifier that is operatively connected to a database 20 including the transcription data 24 and annotation data 25. A data derivation component 18 including program for deriving data derives testing data 27 and training data 26 from the annotated utterances. The program 18 also derives training data 26 and development data 36 from the training data 26. Accordingly, the component 16 is operatively connected to a data store for training data 26 and a data store for development data 36 that is derived from training data. The component also includes a speech recognition engine 19. The training data 26 can be used to generate baseline classifiers using a parameter setting, for example those recommended by developer, or established settings developed by a user. The development data 36 can be used to optimize the parameters for a classifier using recognition results produced by the speech recognition engine 19.

Returning to FIG. 4, the system 1 includes a program 17 for, when executed by the processor, comparing a performance of the update candidate against an initial set of semantic classifiers established by the machine translated transcriptions and source language annotations. The comparison includes testing the update candidate and the initial set of semantic classifiers against a baseline criterion, whereby the initial set of semantic classifiers, such as those trained on the translated transcription, is updated with the update candidate if the update candidate outperforms the initial set of classifiers.

For example, in one embodiment, shown in FIG. 6, the comparison component 17 can optionally include a speech recognizer 15. The comparison speech recognizer 15 is applied to the testing data 27 and produces a hypothesis which is classified using the baseline classifiers 23, thereby producing a baseline classification result. The baseline classification is then compared to the annotation data 25 (e.g., for the percentage of matches) to produce a baseline criterion, (e.g., a score).

In one embodiment a remote hosting service or environment can be provided for at least one of the steps or components of the invention and embodiments described above (e.g., translation, classifier training, development, optimization). In such an embodiment, for instance, utterance classifiers in a spoken dialog system could be remotely localized to a different language by using the available source language's transcriptions and feeding them into a machine translation system which translates them into a target language. The machine-translated texts and their annotations are then subject to training of text classifiers for the target language. This set of classifiers could be sent via an output for sending data over a network for implementation in a spoken dialog system for localization.

Similarly, such a set of semantic classifiers and utterances could be sent via an output for sending data over a network to a remote service. The remote service can host programs for applying quality assurance criteria to the annotated utterances, generating classifiers via the localization described herein, and comparing performance of the classifiers against baseline classifiers. If the update candidate outperforms the initial classifiers, the update candidate can be sent back via an output for sending data over a network back to the service provider, who can accept the data via an input and update the classifiers with the update candidate. Such an embodiment could be implemented in an iterative cycle.

In another embodiment, a module that can be incorporated into a spoken dialog system can perform at least one of the steps of the localization or optimization processes described herein. For example, a separate module that contains programs for applying machine translation to text, quality assurance criteria to annotated utterances, generating classifiers, and comparing performance of the classifiers against baseline classifiers can be incorporated "on-site" into a spoken dialog system. Such an embodiment could be implemented in an iterative cycle. Again, such a component could be hosted remotely or installed as a module.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A spoken dialog system, comprising:
   a computer including a processor, and memory, including:
   a signal input for receiving an audio input;
   a speech recognition engine;
   a data store comprising a set of semantic classifiers;
   a data store for a plurality of utterances received via the audio input;

a data store for storing annotated utterances, the annotated utterances being provided from a source language spoken dialog system;

a semantic classifier component including a semantic classifier program for, when executed by the processor, mapping the utterances to a set of semantic classes; and a data store for storing a plurality of machine-translated transcriptions, wherein a machine translation component translated utterances transcribed in a source language from a source language spoken dialog system into machine-translated transcriptions for a target language, wherein the semantic classifier program maps unaltered source language annotations to respective translated utterances; and a training component for training one of a set of semantic classifiers to localize the spoken dialog system using the machine-translated transcriptions and the unaltered source language annotations.

2. The system of claim 1 wherein the system further includes:

a component for optimizing speech processing in a spoken dialog system.

3. The system of claim 1 wherein the system further includes:

a data derivation component including a program for deriving training data and testing data from the annotated utterances.

4. The system of claim 3 wherein the deriving component further includes program instructions for further separating the training data into training data and development data.

5. The system of claim 2 wherein the system comprises:

a classifier update generation component including a program for, when executed by the processor, generating an update candidate for an initial set of semantic classifiers using data from the annotated utterances and trained on the machine-translated transcribed utterances; and a comparison component including a program for, when executed by the processor, comparing a performance of the update candidate against the initial set of semantic classifiers by testing the update candidate and the initial set of semantic classifiers against a baseline criterion, whereby the initial set of semantic classifiers is updated with the update candidate if the update candidate outperforms the initial set of classifiers.

6. The system of claim 1 wherein the training component includes program instructions for, when executed by a processor:

training of language models;
training of acoustic models;
training a global speech recognizer; and
training a context-dependent speech recognizer.

7. The system of claim 1 wherein the system further comprises:

a remote host for at least one of the components of the system.

8. The system of claim 1 wherein at least one of the components of the system includes a separate module that can be incorporated into a spoken dialog system.

9. The system of claim 1 wherein the machine translation component is selected from the group consisting of:

a rule-based machine translator,
a statistical machine translator; and
a machine translator that is part rule-based and part statistical.

10. A method for localizing a spoken dialog system comprising:

accessing source data from a source-language spoken dialog system, the source data including semantic annotations and transcriptions of a plurality of utterances;

machine-translating the transcribed utterances into a target language;

mapping the semantic annotations that are unaltered to translated transcribed utterances respectively; and training a semantic classifier for the localized spoken dialog system using the machine translated transcriptions and the unaltered source language semantic annotations.

11. The method of claim 10 wherein the method further includes:

optimizing speech processing in the localized spoken dialog system.

12. The method of claim 11 wherein the method further includes:

generating an update candidate for an initial set of semantic classifiers trained on the annotated utterances and the machine-translated transcribed utterances; and comparing a performance of the update candidate against the initial set of semantic classifiers by testing the update candidate and the initial set of semantic classifiers against a baseline criterion, whereby the initial set of semantic classifiers is updated with the update candidate if the update candidate outperforms the initial set of classifiers.

13. The method of claim 10 wherein the method further includes:

deriving testing data and training data from the annotated utterances.

14. The method of claim 13 wherein the method further includes:

separating the training data into training data and development data.

15. The method of claim 10 wherein the training further includes:

training of language models;
training of acoustic models;
training a global speech recognizer; and
training a context-dependent speech recognizer.

16. The method of claim 10 wherein the machine translation is by any one of:

a rule-based machine translator;
a statistical machine translator; and
a machine translator that is part rule-based and part statistical.

* * * * *